(12) United States Patent
Saliba et al.

(10) Patent No.: US 6,271,991 B1
(45) Date of Patent: Aug. 7, 2001

(54) TAPE CARTRIDGE

(75) Inventors: George A. Saliba, Northboro; Satya Mallick, Milford, both of MA (US); Stephen Stamm, Fort Lupton; Greg Hertrich, Longmont, both of CO (US); Chan Kim, North Attleboro, MA (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/330,407

(22) Filed: Jun. 11, 1999

(51) Int. Cl.[7] ............................. G11B 23/02; G11B 23/03
(52) U.S. Cl. ............................. 360/132; 360/133
(58) Field of Search ..................... 360/132, 133

(56) References Cited

U.S. PATENT DOCUMENTS

| | | | |
|---|---|---|---|
| 4,802,045 | * | 1/1989 | Yamamoto et al. ............... 360/132 |
| 5,189,583 | * | 2/1993 | Okamura et al. ................ 360/132 |
| 5,492,284 | * | 2/1996 | Sorensen ...................... 360/132 |
| 5,517,377 | * | 5/1996 | Suzuki et al. ................. 360/132 |
| 5,529,256 | * | 6/1996 | Takahashi et al. .............. 360/132 |
| 5,530,610 | * | 6/1996 | Katagiri et al. ............... 360/132 |
| 5,657,936 | * | 8/1997 | Ohgi et al. ................... 360/132 |
| 6,038,112 | * | 3/2000 | Kletzl ........................ 360/132 |

* cited by examiner

Primary Examiner—Allen T. Cao
(74) Attorney, Agent, or Firm—Steven G. Roeder (57) ABSTRACT

The invention relates to a break-resistant tape cartridge. Reinforcing ribs on the housing and door of the cartridge protect against breakage. The reel and brake of the cartridge employ short teeth with widened roots that strengthen the teeth and reduce shear forces which might cleave the teeth from the reel or the brake. An extra lobe on the hinge of the door reinforces the hinge. The door and the housing are made of a plastic that lacks glass fibers or has a reduced glass fibers content. Furthermore, the plastic without glass fibers improves wear-resistance, and reduces production of debris that can damage the tape and devices that read the tape. The result is a cartridge which is less prone to breakage and wear. The reel may be used in applications other than tape cartridges.

21 Claims, 6 Drawing Sheets

FIG. 1

$$\sigma(stress) = \frac{Mc}{I} = 9750 \text{ psi}$$

$$\gamma_{max} = -\frac{Fl^3}{3EI} = 0.0001$$

FIG. 8
PRIOR ART $\sigma = 1422$ psi $\gamma_{max} = 0.00003$

TAPE CARTRIDGE

BACKGROUND OF THE INVENTION

One device for the storage of electronic data is a single-reel cartridge containing a length of recordable magnetic tape. One common type of cartridge employs a tape-feed reel with teeth disposed along a peripheral edge of the tape-feed reel and a toothed brake which serves to stop rotation of the reel by interlocking with the toothed reel. The tape is fed from the cartridge to a reading device through a hinged door in the surface of the cartridge. These cartridges are widely used throughout many industries, corporations, and similar entities for storage of crucial data, files, and information because they are inexpensive and capable of storing immense quantities of information.

These cartridges, however, can be damaged and rendered unusable by being dropped, or by the ordinary wear that arises from use over an extended period, such as several years. For example, the housing and door of these cartridges are currently composed of a composite material, such as polycarbonate reinforced with glass fibers. While these fibers make the plastic quite strong, they render the plastic brittle and susceptible to breakage. Breakage of either the door or the housing during impact leaves the data inaccessible and may even destroy the tape carrying the data. Additionally, routine use of the cartridge can erode the plastic, generating debris that can damage the tape, the reel or the reading device, resulting in increased errors in reading or recording the data.

Second, the teeth of the tape reel and of the brake can be quite fragile, and can break off when the cartridge is dropped. These loose teeth can damage the tape or the reading device, and can also become wedged under the reel, preventing normal rotation. Also, if the brake is no longer able to stop rotation of the wheel because of broken teeth, the leading end of the tape may get pulled into the reel, making retrieval of the tape impossible to the user.

Although the data can often be retrieved from a damaged cartridge in some cases, the delay incurred by the cartridge failure can be extremely costly to a company in terms of both time and money. In other cases, data critical to the function of a business or other enterprise can be irretrievably lost. Accordingly, a more rugged and durable device for storing such valuable and often irreplaceable data is urgently needed.

SUMMARY OF THE INVENTION

The systems and methods described herein relate to tape cartridges and methods for manufacturing tape cartridges that are resistant to breaking and wear. To this end, cartridges are disclosed that can include reinforcing ribs on the housing and door of the cartridge to protect against breakage. The reinforcing ribs are understood to increase the structural stiffness of the cartridge and to make the cartridge more robust. This allows the cartridge to be made of a material with a reduced glass fiber content. It is understood that glass fibers add to the structural strength of the cartridge, but reduce impact strength, increase the production of debris during normal use, and reduce the life of production tools that shape the cartridge. Additionally, the reel and brake of the cartridge can employ short teeth with widened roots that strengthen the teeth against shear forces which might cleave the teeth from the reel or the brake.

In one embodiment, the housing and the door are made of a material substantially free of glass fibers, increasing the impact strength relative to a material which includes glass fibers. In a related embodiment, the door and housing are further reinforced with at least one raised rib, and the door may be connected to the housing with a reinforced hinge. The raised ribs may be disposed laterally along the door or radially within the cartridge, or in any other disposition which provides structural reinforcement. In an additional embodiment, the housing includes interior walls which further reinforce the housing.

In a further embodiment, the teeth of the tape-feed reel mounted within the housing are connected to the reel by roots that widen to the base to provide resistance to shearing forces. Optionally, the teeth of the brake can also be connected to the brake by roots which widen at the base. The dimensions of the tooth can be selected according to the application, and in one embodiment, the length of a tooth and the width of a tooth at its base may be substantially similar in magnitude. In another embodiment, the widening roots of the teeth are half, or a third of the length of each tooth. In yet another embodiment, the width of a tooth at the base of the tooth is substantially similar to the thickness of the tooth at the base of the tooth, e.g., the cross-section of the base of the tooth is substantially square. In other embodiments, the cross-sectional area of the base of the tooth is greater than the area of the profile of the tooth. The profile of the tooth is the face of the tooth coplanar with the structure carrying the tooth, e.g., the face of the tooth coplanar with the flat surface of a tape-feed reel, as opposed to the edge of the tape-feed reel.

A second aspect of the invention provides methods for manufacturing a tape cartridge. In one practice, the method includes mounting within a housing a rotatable tape-feed reel with a peripheral edge carrying a plurality of teeth. Each tooth has a root coupling the tooth to the reel, and the root widens to render the tooth resistant to shearing. Furthermore, a brake with teeth, each tooth having a root coupling the tooth to the brake and having a shape complementary to a tooth of the reel, may be disposed within the housing such that engagement of the teeth of the brake with the teeth of the reel generates a braking force. Optionally, a door may be mounted to the housing with a hinge constructed for increased durability.

BRIEF SUMMARY OF THE FIGURES

The following figures depict certain illustrative embodiments of the invention in which like reference numerals refer to like elements. These depicted embodiments are to be understood as illustrative of the invention and not as limiting in any way.

DETAILED DESCRIPTION OF THE ILLUSTRATED EMBODIMENTS

The description below pertains to several possible embodiments of the invention. It is understood that many variations of the systems and methods described herein may be envisioned by one skilled in the art, and such variations and improvements are intended to fall within the scope of the invention. Accordingly, the invention is not to be limited in any way by the following disclosure of certain illustrative embodiments.

The systems and methods disclosed herein relate to durable tape cartridges. Particularly, the cartridges described herein are more resistant to breakage when dropped, and generate less debris by being more resistant to wear during normal use. For purposes of clarity, the tape cartridges described herein will be described as cartridges for holding a length of tape, such as a length of recording tape for storing computer data, video data, analog signals or any other type of information that can be stored on a tape. However, it will be understood by one of ordinary skill in the art that the cartridges can be employed for other applications.

Figure 1:
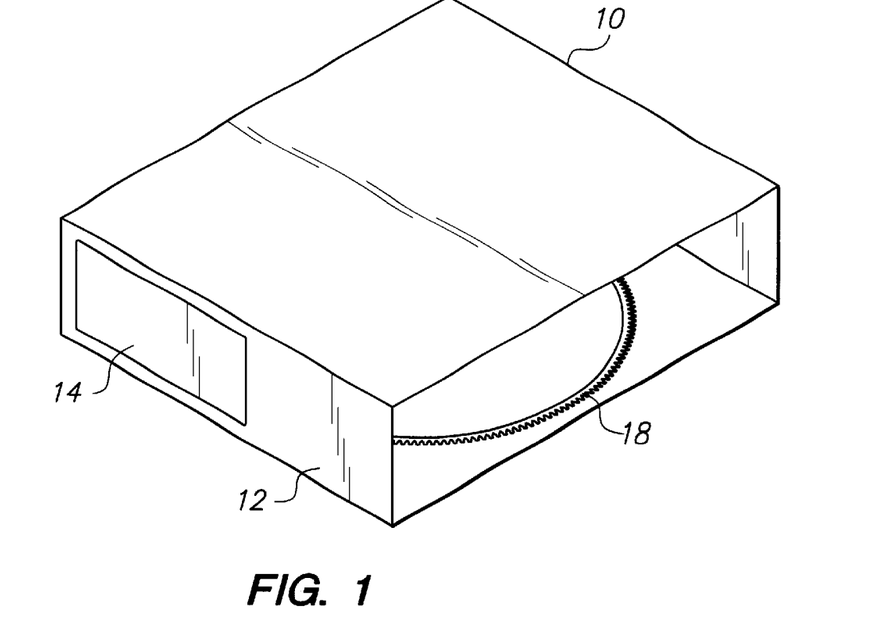
FIG. 1 depicts a cutaway view of one embodiment of a tape cartridge.

FIG. 1 depicts a cutaway view of a tape cartridge 10. The cartridge 10 may include a housing 12, a door 14 mounted on the housing, and a tape-feed reel 18 mounted within the housing 12. A tape-feed reel, as this term is employed herein, will be understood to encompass any substantially circular structure which is capable of receiving, holding, or releasing a length of tape.

The housing 12 may be composed of a material substantially free of glass fibers. A material which contains less than 10% glass fibers, less than 5%, or less than 2%, is said to be 'substantially free' of glass fibers. Exemplary materials include metal, plastic, rubber, ceramics, and composites thereof. A particular example of a plastic commonly used for forming housings, such as the housing 12, is polycarbonate. Use of a material lacking these glass fibers is understood not only to strengthen the plastic with respect to impact, but to make the material more resistant to the wear encountered in normal use. Reducing the amount of debris generated by such wear similarly reduces read errors and media damage that may be caused by such debris. Furthermore, use of a material substantially free of glass fibers increases the life of the molds used to manufacture the housings. Increasing the life of the molds reduces the cost of manufacturing such housings.

The depicted housing 12 may be of any shape or dimension which permits a tape reel 18 to be contained therein. The particular housing 12 shown in FIG. 1 is box-shaped and contains a single tape-feed reel 18, although other shapes, including disc-shaped, elliptical, square, and triangular housings, which may contain one or more reels, are contemplated and encompassed by this invention. The housing 12 may be formed of any material which is resistant to breakage on impact and does not generate destructive debris during normal use of the cartridge.

Figure 2:
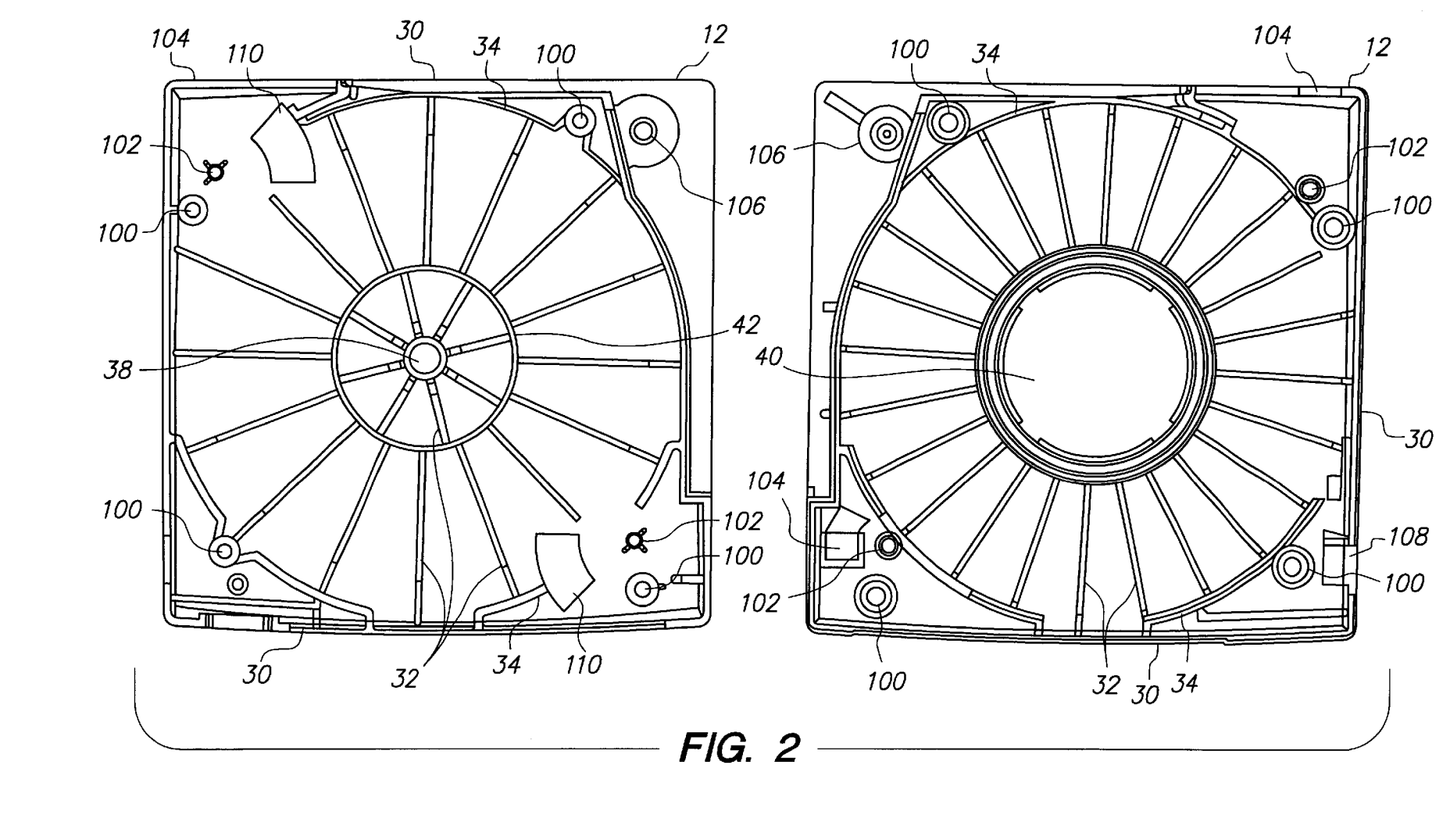
FIG. 2 depicts a tape cartridge housing having reinforcing ribs disposed radially about the surface and interior walls.

FIG. 2 depicts the top and bottom shells of a housing 12 according to one embodiment. The housing 12 may include exterior walls 30, raised ribs 32, interior walls 34, an axle mount 38, a central aperture 40, and one or more circular ridges 42.

Raised ribs 32 may be disposed on the surface of the housing 12. A 'raised rib' refers to a structural feature disposed on a surface of an object that protrudes slightly from the surface of that object and has dissimilar dimensions of length and width parallel to the surface of the object. A raised rib 32 may be formed of the material of the surface, or may be formed separately and coupled to the surface. Portions of a raised rib 32 may protrude from the surface by differing amounts, or by the same amount. These ribs 32, which may be composed of the same material as the housing 12, stiffen and reinforce the structure of the housing. There should be at least one rib 32, although there may be as many ribs 32 as may be disposed on the surface of the housing 12. The ribs 32 may be spaced evenly or unevenly about the housing 12, and optionally are disposed such that not all ribs 32 are parallel. The ribs 32 need not be straight, but may be curved, circular, angular, or any other shape. The ribs 32 preferably do not protrude into the housing 12 so much as to impede the rotation of the tape-feed reel, but may be raised enough to provide the desired structural reinforcement. The ribs 32 may be of any width. Two or more raised ribs 32 may be radially disposed on the housing. The ribs 32 may extend from the center of the housing 12 to the exterior wall 30, or they may extend only a portion of that distance. As shown in FIG. 2, ribs 32 of the top shell may extend from an axle mount 38 to a circular ridge 42, or ribs may extend from the circular ridge 42 to an interior wall 34. Ribs 32 of the bottom shell may extend from the central aperture 40 to an interior wall 34 or to an exterior wall 30.

Additionally, the housing 12 may include one or more interior walls 34 for additional strength. An interior wall, as the term is used herein, will be understood to include any structure located on the inside of an object which extends from a surface of that object to a height greater than a dimension perpendicular to the height. These interior walls 34 may extend from the top exterior wall 30 of the top shell to the bottom exterior wall 30 of the bottom shell, or may be shorter, including a similar height to the ribs 32. The interior walls 34 may have a semi-circular contour as shown in FIG. 2, or they may optionally be elliptical, curved, straight, or square in contour. They may be composed of the same material as the housing 12 and may be of any thickness that provides the desired strength.

An axle mount 38 and a central aperture 40 may be provided for mounting a tape-feed reel 18 within the housing 12. The axle mount 38 may provide a support upon which the tape-feed reel 18 may rotate. An axle mount 38 may be any structure which supports the tape-feed reel 18 and allows it to rotate. The central aperture 40 allows for the engagement of an external mechanism to cause rotation of the tape-feed reel 18. The axle mount 38 and the central aperture 40 may be disposed on opposite faces of the housing 12. As shown in FIG. 2, the central aperture 40 may be located on the bottom shell and the axle mount 38 on the top shell, although the positions may be reversed.

A housing 12 may further include one or more screw posts 100 for coupling the bottom shell with the top shell. Other methods of coupling the top shell with the bottom shell will be known to those of skill in the art, and do not depart from the spirit of the systems and methods disclosed herein. Additionally, one or more brake posts 102 may be included for coupling one or more brakes 70 to the housing 12. Openings 104 may be placed in the housing 12 to permit external structures to activate one or more brakes 70 mounted within the housing 12. Hinge posts 106 may be further included to facilitate mounting the door 14 on the housing. A tape cartridge 10 may also have an interposer notch 108 for locking the cartridge 10 in a drive for reading the tape held within the cartridge 10. Clearance grooves 110 may also be included in the housing 12 to allow a brake 70 to rest slightly below the plane of the reel, permitting more efficient engagement of the teeth 60 of the brake 70 with the teeth 60 of the reel 18.

Figure 3:
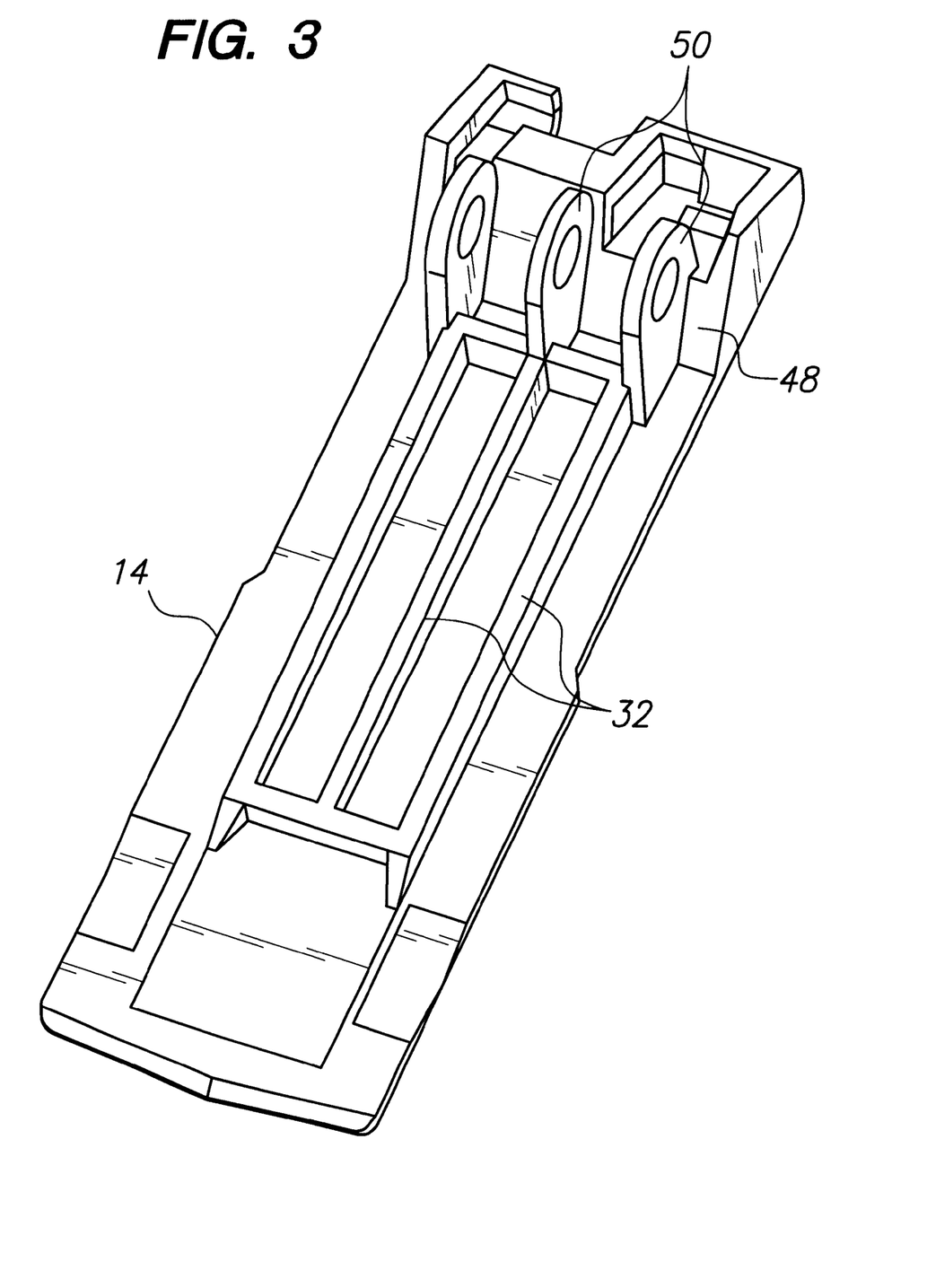
FIG. 3 depicts a tape cartridge door having a three-lobed hinge and reinforcing ribs.

The tape cartridge 10 may also have a door 14 connected to the housing 12 by a hinge 48, which may include lobes 50 as shown in FIG. 3. The depicted lobes 50 protrude from the door 14 and comprise portions of a hinge 48. The lobes 50 may be adapted for attachment to the housing. In FIG. 3, the lobes 50 are fitted with holes to facilitate attachment to the housing 12, although other means of attaching a door to a housing with a hinge are well known in the art and are considered equivalents of the pictured hinge, including embodiments wherein lobes are disposed on the housing instead of the door. The hinge may be of any design which allows the door to controllably cover and uncover an opening in the housing. The use of three lobes 50 provides additional strength, making the hinge 48 less prone to breaking when the cartridge is dropped.

The door 14 may be formed of a material substantially free of glass fibers. Although glass fibers lend strength to plastic, such fibers are understood to decrease the impact strength of the plastic, rendering doors made of plastic with glass fibers susceptible to breakage when dropped. Fabricating the door of a material lacking glass fibers increases the impact strength of the door and makes the door more wear-resistant. Reducing the amount of debris generated by wear reduces in turn read errors and media damage which can be caused by such debris. Furthermore, the use of a material that does not have glass fibers increases the life of the molds used to manufacture such doors, thereby reducing the cost of manufacturing such doors. The door 14 may be formed of any material that is resistant to breakage on impact and does not generate destructive debris during normal use of the cartridge.

Furthermore, the door 14 may be reinforced with at least one rib 32 disposed laterally along the surface of the door, although two, three, or more ribs 32 will provide additional reinforcement. These ribs 32 may have the general characteristics of ribs as discussed above. As many ribs 32 may be disposed on the door 14 as may possibly be placed on the door 14. The ribs 32 may be disposed along the entire length of the door 14, or only a portion of the length of the door 14, as shown in FIG. 3. Although the door 14 depicted is rectangular, a door may be any shape, e.g., circular, oval, triangular, etc., that permits for controllably covering and uncovering an opening in the housing having an area no larger than that of the door. If the opening in the housing is not two-dimensional, the door should be suitably shaped to cover all portions of the opening.

Figure 4:
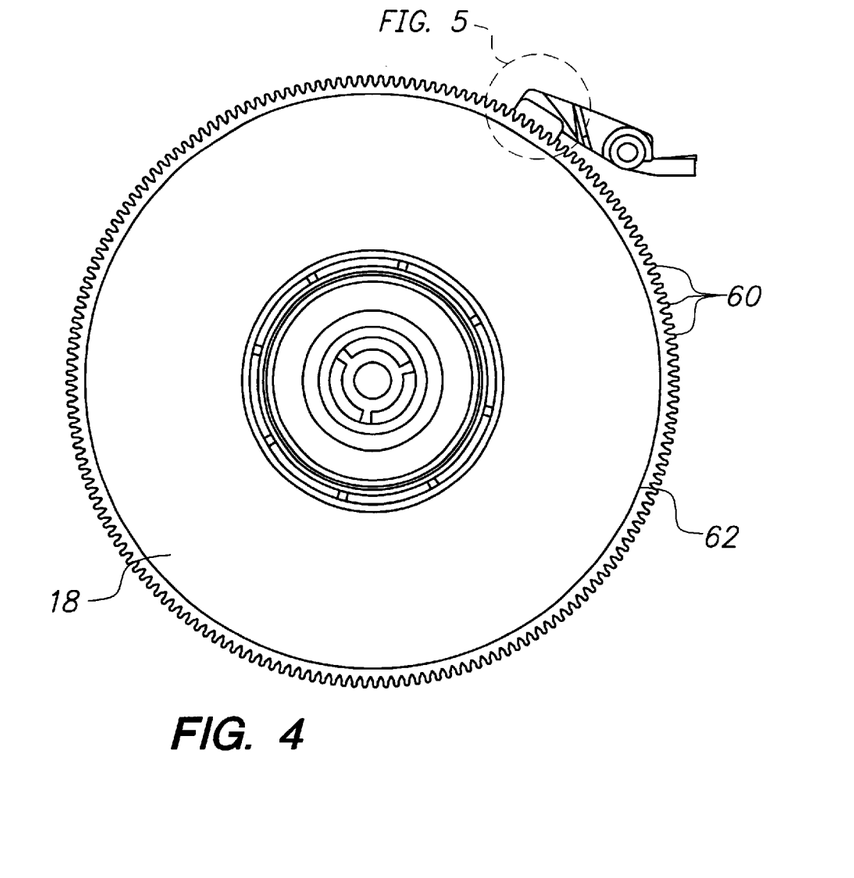
FIG. 4 depicts a tape-feed reel and complementary brake bearing teeth with roots that widen for increased strength.
Figure 5:
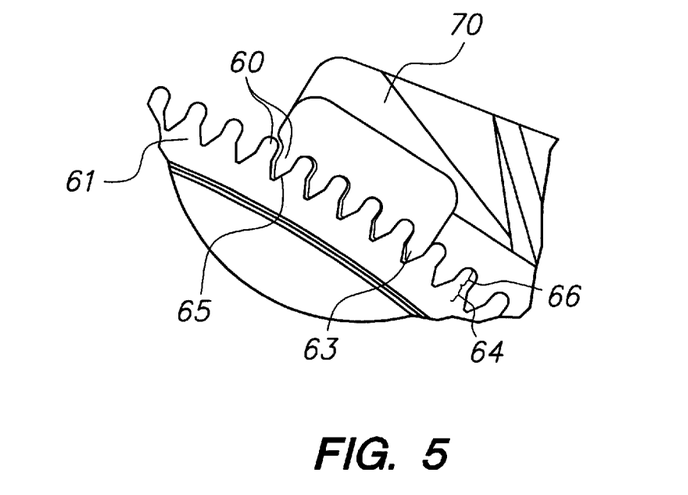
FIG. 5 depicts a magnified view of the interaction of the brake with the reel.

A tape cartridge as described herein may also have at least one tape-feed reel 18 mounted within the housing 12. The reel 18 may be of any geometry that permits the reel 18 to hold a length of tape. As shown in FIG. 4, a plurality of teeth 60 may be disposed along the peripheral edge 62 of this reel 18. Each tooth 60 mounted to the reel 18 widens at its root 64 to strengthen the tooth 60 and thereby reduce or prevent possible shearing of the tooth 60 from the reel 18. This widening at the root 64 is shown in greater detail in FIG. 5.

Figure 6:
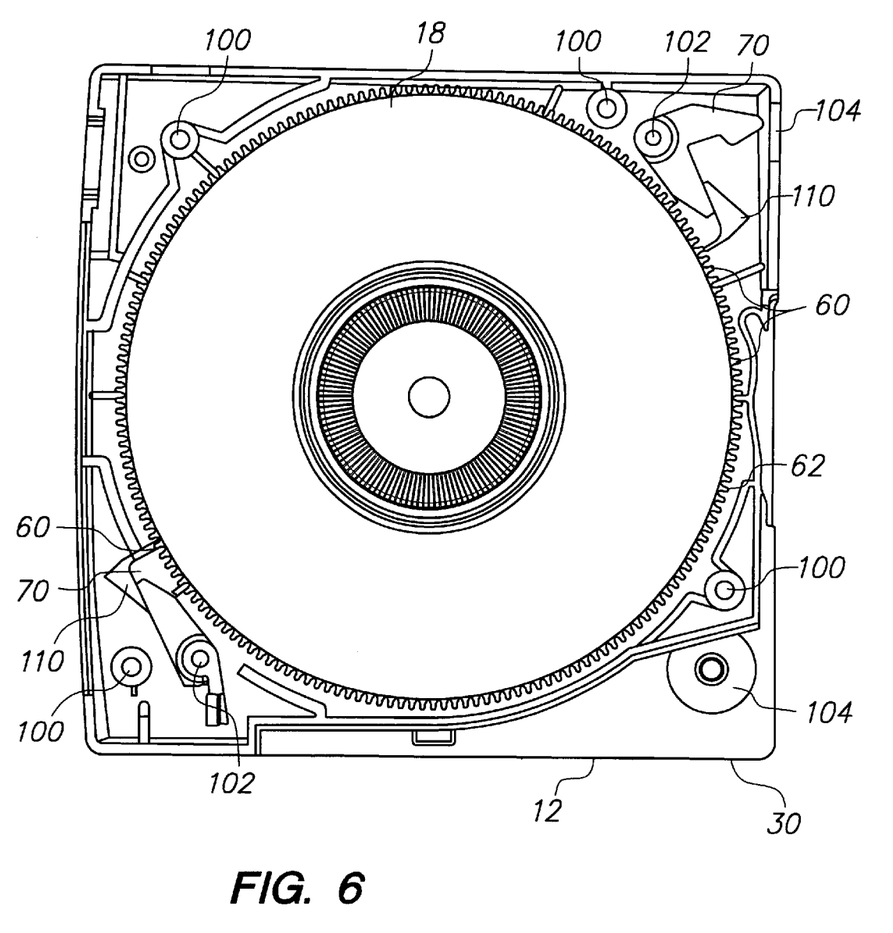
FIG. 6 depicts a toothed brake mounted within a housing.

The teeth 60 on the reel 18 may be complementary to the teeth 60 on a brake 70. A brake, as the term is used herein, will be understood to include any object which interacts with another object to form a mechanical stop. The brake 70 is disposed so that the teeth 60 of the brake 70 may engage with the teeth 60 of the reel 18 to form a mechanical stop. The brake 70 may be disposed within the cartridge 10 as shown in FIG. 6, or may be disposed outside the cartridge 10, such as in the reading device. The brake 70 may be shaped as shown in FIG. 6, or the brake 70 may be wedge-shaped, square, triangular, circular, rectangular, or any other shape that allows the brake to form a mechanical stop with a reel. Teeth may be disposed on any surface of the brake or a portion thereof in any fashion that allows the teeth of the brake to engage the teeth of the reel. A brake which does not have teeth but can still engage the teeth of the wheel is within the scope of the invention. The teeth of either the reel, the brake, or both may have roots which widen towards the point of attachment to render the teeth resistant to shearing forces.

The teeth 60 of the reel 18 and the teeth 60 of the brake 70 may be shaped such that the force generated by the interaction of a tooth 60 of the reel 18 and a tooth 60 of the brake 70 acts close to the base of the tooth, e.g., on the root 64 of the tooth. A force which acts close to the base of the tooth 60 has a reduced cantilever effect, thereby reducing the shearing force acting on the base of the tooth 60. In an exemplary embodiment, depicted in FIG. 5, the profile 61 of the tooth 60 of the reel 18 and the complementary profile 63 of the tooth 60 of the brake 70 are shaped so that the braking force acts on the root 64 of the tooth 60 at the surface of interaction 65, which is defined by a surface at the root 64 of the tooth 60 of the reel 18 and a surface near the tip of the tooth 60 of the brake 70. Because the root 64 of the tooth 60 of the reel 18 widens at the base, the force is distributed over a large cross-sectional area relative to a tooth that does not widen. Furthermore, the surface of interaction 65 is angled relative to the peripheral edge of the wheel. The angle between the peripheral edge of the wheel and the surface of interaction 65 allows the vector of the braking force to act in a direction that is not tangential to the peripheral edge of the reel 18, and thus to have a component that acts towards the center of the reel 18. This component therefore does not contribute to the shearing force, which acts along a tangent of the peripheral edge of the reel. The shapes of the profiles 61 and 63 may thus be selected both to reduce the shearing force and to distribute the force over a larger cross-sectional area, thereby reducing the risk of a tooth 60 breaking from the reel 18 during braking or accidental dropping. Other shapes of the profiles 61 and 63 that similarly reduce the shearing force will be apparent to those of skill in the art.

Figure 8:
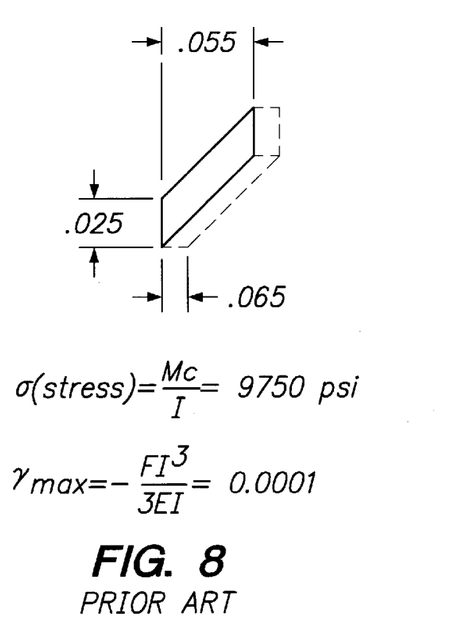
FIG. 8 depicts in detail a tooth in the prior art.
Figure 9:
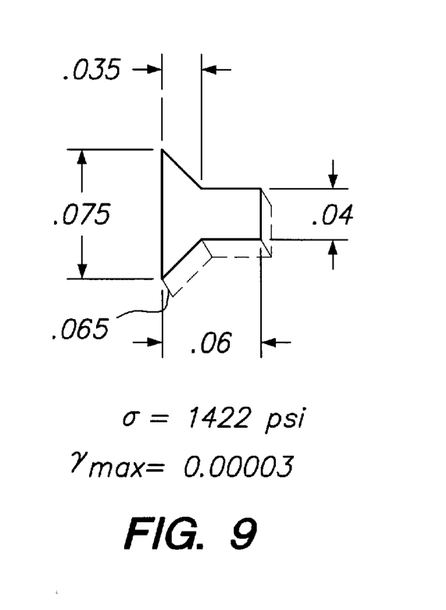
FIG. 9 depicts in detail a tooth according to the systems and methods described herein.

FIGS. 8 and 9 allow the comparison of improved teeth as described herein with teeth of the prior art. The tooth depicted in FIG. 8, which is representative of teeth currently employed on reels for tape cartridges, has a slanted profile and a square cross-section. The tooth does not widen, and the cross-sectional area does not change from the tip of the tooth to the base. Furthermore, the tooth has a length (0.055 in) substantially greater in magnitude than its width (0.025 in). The stress such a tooth is calculated to withstand (Mc/I) is 9750 psi, and the deflection ($-Fl^3/3EI$) is calculated to be 0.0001". A modified tooth, such as may be useful in the systems and methods described herein, is depicted in FIG. 9. This tooth widens at the base to a width (0.075 in) about twice the width of the tooth nearer the tip (0.04 in). The root of the tooth widens over more than half (0.035 in) of its length (0.6 in). The width of the tooth at its center (>0.04 in) is substantially similar to the length of the tooth (0.06 in). These structural changes are calculated to reduce stress by a factor of 6 (from 9750 psi to 1422 psi) and deflection by a factor of 3 (from 0.0001" to 0.00003"). The tooth depicted in FIG. 9 is not intended to be limiting, but is merely one possible embodiment of the systems and methods described herein.

A reel having teeth as described above and used for a purpose other than for storing, holding, or dispensing tape is held to be within the scope of the present invention. Such reels may be useful as gears, for storing rope, string, tape, or wire, or in any of a wide range of applications known to those of skill in the art and are encompassed by the systems and methods disclosed herein.

Figure 7:
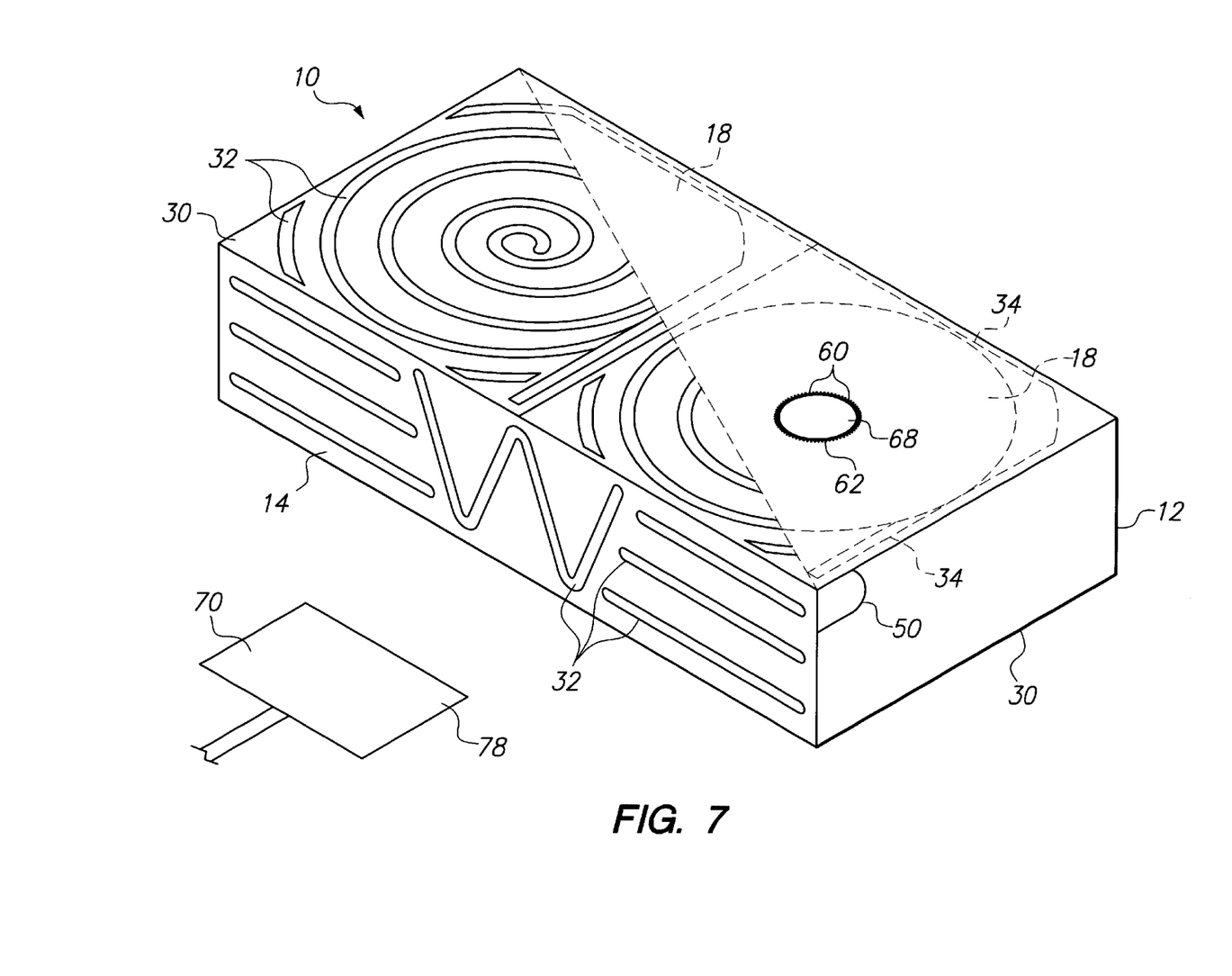
FIG. 7 depicts a second embodiment of a tape cartridge.

FIG. 7 depicts a second representative embodiment of the tape cartridge 10. In this embodiment, the cartridge 10 includes a housing 12, a door 14, and two tape-feed reels 18. The housing 12 is formed of a material substantially free of glass fibers as discussed above. Although the cartridge 10 shown is rectangular, other shapes may function similarly as discussed above. The housing 12 has ribs disposed on an exterior wall 30. Some ribs 32 are arranged spirally over each of the two tape-feed reels 18, some are curved and reinforce the corners, and one is straight and extends down the center of the cartridge 10. Other arrangements of ribs are possible, as discussed above. The ribs may also have various other characteristics as discussed above. The housing 12 also contains interior walls 34, some of which are straight and others of which are curved, that conform to the descriptions above.

The door 14 may be mounted on the housing 12 by means of a hinge 48 with lobes 50 on both sides of the housing 12. Additional lobes 50 may be placed along the length of the door 14. The door 14 may be made of a material substantially free of glass fibers as discussed above and has ribs 32 disposed along its length. The ribs 32 have differing lengths and shapes and may further conform to the description above.

The housing 12 contains two tape-feed reels 18 which have triangular teeth 60 disposed about a peripheral edge 62 of the hub 68 of the reel 18. The teeth 60 conform to the specifications disclosed above. Because each tooth 60 widens from the top of the tooth 60 to the bottom, the root 64 comprises the entirety of the tooth 60. The brake 70, which does not have teeth, is disposed outside of the cartridge 10. When the brake 70 enters the cartridge 10 through the door 14, vertices 78 of the brake 70 can engage the teeth 60 of the reels 18 and form a mechanical stop.

The various components described in detail above may all be produced in molds using manufacturing techniques well known in the art. The individual parts may then be assembled and fastened together as needed, according to procedures well known to those of skill in the art.

While the invention has been disclosed in connection with the embodiments shown and described in detail, various equivalents, modifications, and improvements will be apparent to one of ordinary skill in the art from the above description. Such equivalents, modifications, and improvements are intended to be encompassed by the following claims.

What is claimed is:

1. A magnetic tape cartridge for storing a magnetic tape, the magnetic tape cartridge comprising:
    a housing;
    a reel rotatably mounted within the housing that receives the magnetic tape, the reel having a peripheral edge including a plurality of adjacent reel teeth that define a plurality of reel teeth gaps, each of the reel teeth having a root and a tip; wherein, for each reel tooth, the root is wider than the tip to resist shearing forces; and
    a brake mounted within the housing, the brake including a plurality of adjacent brake teeth that simultaneously engage a plurality of the reel teeth, each of the brake teeth having a root and a tip; wherein, for each brake tooth, the root is wider than the tip to resist shearing forces; wherein each of the brake teeth is sized and shaped to substantially fill one of the reel teeth gaps.

2. The magnetic tape cartridge of claim 1 wherein the shapes of the reel teeth and the brake teeth are designed so that the interaction of the reel teeth and the brake teeth primarily occurs at the roots of the reel teeth and wherein a surface on the root of a reel tooth interacts with a surface near a tip of a brake tooth to direct the braking force at an angle to the peripheral edge of the reel.

3. The magnetic tape cartridge of claim 1 wherein each of the reel teeth includes a center; wherein each of the reel teeth has a tip width near the tip, a center width near the center, and a root width near the root; and wherein, for each of the reel teeth, the tip width is approximately equal to the center width and the root width is approximately twice as wide as the tip width and the center width.

4. The magnetic tape cartridge of claim 1 wherein the tip of each of the reel teeth is rounded and a cross-sectional area of the base of each of the reel teeth is greater than an area of a profile of each of the reel teeth.

5. The magnetic tape cartridge of claim 1 wherein the housing includes at least three non-parallel ribs that are radially disposed relative to a housing center of the housing, the ribs being adapted to reinforce the housing.

6. The magnetic tape cartridge of claim 1 wherein the housing includes a spiral-shaped rib adapted to reinforce the housing.

7. The magnetic tape cartridge of claim 1 further comprising a door having a hinge, the hinge including at least three lobes adapted to reinforce the hinge.

8. A magnetic tape cartridge comprising:
    a magnetic tape;
    a reel that receives the magnetic tape; and
    a housing that encloses the reel, the housing having at least three nonparallel ribs, the ribs reinforcing the housing.

9. The magnetic tape cartridge of claim 8 wherein the at least three nonparallel ribs are radially disposed relative to a housing center of the housing.

10. The magnetic tape cartridge of claim 8 wherein the ribs are spiral-shaped.

11. The magnetic tape cartridge of claim 8 further including a door having a hinge, the hinge including at least three lobes adapted to reinforce the hinge.

12. The magnetic tape cartridge of claim 8 wherein the reel has a peripheral edge including a plurality of reel teeth having roots coupling the reel teeth to the reel, wherein the roots widen for resistance to sheering forces.

13. The magnetic tape cartridge of claim 12 further comprising a brake mounted within the housing, the brake includes a plurality of brake teeth that are configured to be complimentary in size and shape to the reel teeth.

14. The magnetic tape cartridge of claim 13 wherein the shapes of the reel teeth and the brake teeth are designed so that the interaction of the reel teeth and the brake teeth occurs at the roots of the reel teeth.

15. A method for braking a reel of a magnetic tape cartridge, the method comprising the steps of:
    providing a reel having plurality of adjacent reel teeth that define a plurality of reel teeth gaps, each of the reel teeth having a root and a tip; and
    providing a brake having a plurality of adjacent brake teeth that are each sized and shaped to substantially fill one of the reel teeth gaps;
    engaging a plurality of the reel teeth with a plurality of the brake teeth.

16. The method of claim 15 wherein the step of providing the reel and the step of providing the brake includes sizing and shaping the reel teeth and the brake teeth so that the braking force acts on the roots of the reel teeth.

17. The method of claim 15 wherein the step of providing the reel includes sizing the shaping the reel teeth so that the cross-sectional area of a base of one of the reel teeth is greater than an area of a profile of one of the reel teeth.

18. The method of claim 15 wherein the step of providing the brake includes sizing the shaping the brake teeth so that the brake teeth are complimentary to the size and shape of the reel teeth.

19. The method of claim 15 further comprising the step of positioning the reel and the brake within a housing, the housing including at least three non-parallel ribs that are radially disposed relative to the housing center, the ribs being adapted to reinforce the housing.

20. The method of claim 15 further comprising the step of positioning the reel and the brake within a housing, the housing including a spiral-shaped rib, the rib being adapted to reinforce the housing.

21. The method of claim 15 further comprising the step of positioning the reel and the brake within a housing, the housing including a door having a hinge, the hinge including at least three lobes adapted to reinforce the hinge.

* * * * *